United States Patent Office — 3,572,990
Patented Mar. 30, 1971

3,572,990
AMMONIUM POLYPHOSPHATE PRODUCED AT ATMOSPHERIC PRESSURE
Thad D. Farr, Sheffield, and Henry K. Walters, Jr., Florence, Ala., assignors to Tennessee Valley Authority
Continuation-in-part of application Ser. No. 765,744, Oct. 2, 1968, which is a division of application Ser. No. 663,171, Aug. 24, 1967, now Patent No. 3,484,192. This application Feb. 27, 1970, Ser. No. 15,249
Int. Cl. C01b 25/28, 25/38
U.S. Cl. 23—107        1 Claim

ABSTRACT OF THE DISCLOSURE

A process for the preparation of ammonium polyphosphate by the ammoniation of polyphosphoric acids containing more than 80 percent $P_2O_5$ with concurrent hydrolysis of the objectionable long-chain phosphate species. An intermediate aqueous slurry, pH 7.4 to 8.9, is prepared at 50° to 110° C. and processed further to produce granular solids, with good physical properties, that contain in approximately equal proportions ammonium ortho-, pyro-, and tripolyphosphates.

---

The invention herein described may be manufactured and used by or for the Government for governmental purposes without the payment to us of any royalty therefor.

This application is a continuation-in-part of application Ser. No. 765,744 filed Oct. 2, 1968, and now abandoned, which application Ser. No. 765,744 in turn is a division of our parent application Ser. No. 663,171, filed Aug. 24, 1967, now U.S. Patent 3,484,192.

Our invention relates to an improved process for the production of high-analysis ammonium polyphosphate salts, and more particularly to the preparation of ammonium acyclic polyphosphate salts by the ammoniation of superphosphoric acid at atmospheric pressure.

The term "superphosphoric acid" used in the specification and claim is defined as a mixture of ortho-, pyro-, and higher condensed phosphoric acids with the general formula $H_{n+2}P_nO_{3n+1}$. The distribution of the acid species varies with the $P_2O_5$ content of the superphosphoric acid. The Canadian Journal of Chemistry, vol. 34 (1956), page 790, shows that superphosphoric acid in the range 69.81 to 84.95 percent $P_2O_5$ contains the following proportions of ortho-, pyro-, and higher condensed acyclic polyphosphoric acids, expressed as percent of total phosphorus.

97.85 to 2.32 percent ortho-
    2.15 to 49.30 percent pyro-
    0.00 to 24.98 percent tripoly-
    0.00 to 16.99 percent tetrapoly-
    0.00 to 12.64 percent pentapoly-
    0.00 to 9.75 percent hexapoly-
    0.00 to 8.63 percent heptapoly-
    0.00 to 7.85 percent octapoly-
    0.00 to 6.03 percent nonapoly-
    0.00 to 29.41 percent higher polymers Acids of the above type are available from commercial sources of electric-furnace superphosphoric acid plants and may be produced with $P_2O_5$ contents ranging from about 74 to about 83 percent by a process described in U.S. Patent 3,015,540, Striplin.

Our invention is especially valuable in the production of solid ammonium polyphosphate by the atmospheric ammoniation of superphosphoric acid of any practical $P_2O_5$ content higher than about 80 percent. Either electric-furnace acid or concentrated wet-process acid can be used. If concentrated wet-process phosphoric acids are desired, they can be produced by concentrating ordinary merchant-grade wet-process phosphoric acid containing approximately 54 weight percent $P_2O_5$ and also containing incidental metallic impurities ranging from about 1 to 10 percent by a dehydration process to remove water from the merchant-grade wet-process phosphoric acid and increase its $P_2O_5$ content up into the wet acid super range of about 60 percent to about 80 percent $P_2O_5$ by a process such as that described in the copending application Ser. No. 835,377, Getsinger, assigned to the assignee of the present invention, and also described in U.S. Patent 3,192,013. When using such wet-process phosphoric acid, the distribution of the acid species therein has been observed to be somewhat different from that which would result if highly concentrated substantially pure furnace acid were used.

Heretofore a method for the production of ammonium polyphosphate has been described in U.S. Patents 3,171,733 and 3,228,752, Hignett et al. In this prior process, superphosphoric acid, either wet-process or electric-furnace type, is treated with gaseous ammonia in a reactor under a pressure of about 25 to about 1000 p.s.i.g. and a temperature of 365° to 450° F., the molten material is discharged from the reactor and is granulated by mixing with recycle fines in a pugmill, and the granules are cooled and then screened to separate particles of the desired size for product. The products had compositions ranging from 12.9 to 18.3 percent N and 59.2 to 64.2 percent $P_2O_5$, which corresponds to a degree of ammoniation ranging from 4.9 to 7.5 pounds $NH_3$ per unit (20 pounds) $P_2O_5$. The product is composed of two major phases, monoammonium orthophosphate and triammonium pyrophosphate, and a minor phase diammonium pyrophosphate; the phosphate is divided about equally between ortho and non-ortho forms. Some of the products from this pressure process, however, have had some outstanding disadvantages. It has a relatively low degree of ammoniation as compared to 9.6 pounds $NH_3$ per unit $P_2O_5$ in diammonium orthophosphate or in tetraammonium pyrophosphate. Another disadvantage is that it will cake in storage unless condition; the caking characteristics have been attributed to the instability of one of its major phases.

Another method for preparing solid ammonium phosphates of unspecified distribution of phosphate species by ammoniating concentrated wet-process orthophosphoric acid ($P_2O_5$ content between 68.6 and 80 percent) at 70° C. to 225° C. to provide at least 0.14 part N per part P is described in U.S. Patents 3,241,946 and 3,243,279, D. C. Young. Young states: "The exact nature of the ammonium phosphate products is not known with certainty. It is believed, however, that the major proportion of the product is a mixture of ammonium orthophosphates and ammonium polyphosphates with the presence of some P-N bonds, e.g., phosphoamido and phosphoimido compounds." Young does not specify how acid concentration, temperature, pH, and water content affect the distribution of phosphate species in such products, whereas, in the present application we do specify and give examples of the effects of acid concentration, temperature, pH, and water content of the distribution of phosphate species in the solid products obtained. Furthermore, Young does not teach, as we do, how these process variables may be controlled to obtain solid products with a high degree of ammoniation and with a desirable combination of orthophosphate and condensed phosphates.

It is therefore an object of the present invention to provide a process wherein superphosphoric acid containing more than about 80 percent $P_2O_5$ is ammoniated and hydrolyzed under specified conditions to prepare an intermediate slurry at pH about 8 that is granulated with recycle and dried to produce final granular products which have relatively high ratios of N to $P_2O_5$, which consist of ammonium ortho-, pyro-, and tripolyphosphates in approximately equal proportions, and which have good handling and storage properties.

Another object of the present invention is to provide a process in which the ammoniation of superphosphoric acids is carried out economically at atmospheric pressure with conventional equipment.

Still further and more general objects and advantages of the present invention will appear from the more detailed description set forth, it being understood, however, that this more detailed description is given by way of illustration and explanation only and not by way of limitation, since various changes therein may be made by those skilled in the art without departing from the spirit and scope of the present invention.

In carrying out the objects of our invention, we provide for the ammoniation and hydrolysis of superphosphoric acids at atmospheric pressure to produce intermediate slurries which are subsequently granulated to produce granules of ammonium polyphosphates containing about equal proportions of ammonium ortho-, pyro-, and tripolyphosphates.

Our invention, together with further objects and advantages thereof will be better understood from a consideration of the following descriptions taken in connection with the accompanying drawings in which.

In this modification of our process for the preparation of ammonium polyphosphate, which is designated as the controlled hydrolysis modification and is a continuation-in-part of our application Ser. No. 765,744, filed Oct. 2, 1968, which in turn is a division of our parent application Ser. No. 663,171, filed Aug. 24, 1967, now U.S. Patent 3,484,192, the acids are ammoniated and hydrolyzed to prepare intermediate aqueous slurries with pH's ranging from about 7.4 to 8.9 that are processed further to produce granular solids. In developing this modification of our process to produce ammonium polyphosphates comprising ammonium ortho-, pyro-, and tripolyphosphates in approximately equal proportions, we discovered (1) that the temperature and pH at which the concentrated acid is ammoniated are critical in controlling the desired hydrolysis reactions, and (2) that to prepare intermediate slurries at high pH suitable for granulation, it is necessary to use ammoniated acid solutions in which no more than about 15 percent of the phosphate is in forms more highly condensed than tripolyphosphate. Although the quantity of water used may vary widely, we discovered that the ammoniation reactions are benefited, and that the viscosities and the ratio of solid to solution in the slurries produced are optimal when the total water added ranges from about 0.8 to 1.4 pound per pound of $P_2O_5$ in the starting acid.

By selecting a set of operating conditions of pH, temperature, and retention time for ammoniating a specific acid, all the phosphate species more highly condensed than tripolyphosphate may be hydrolyzed, although we prefer to operate under conditions in which these long-chain species are reduced to about 15 percent. We prefer to carry out the ammoniation-hydrolysis reactions continuously, or it may be done batchwise, or as a combination of both.

Figure 2:
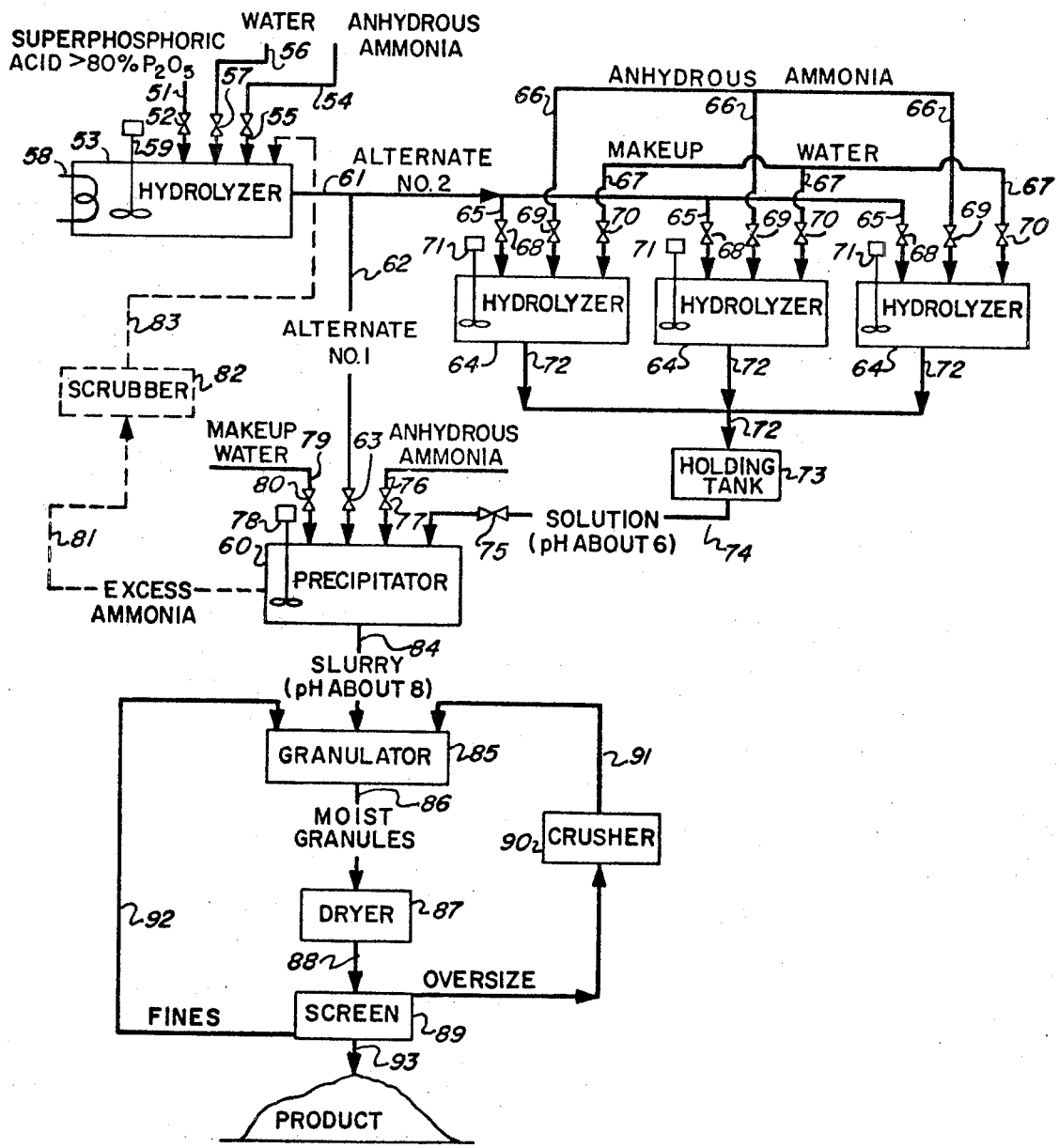
FIG. 2 is a flowsheet generally illustrating the principles of two alternate procedures of our controlled hydrolysis process which results ultimately in the production of the desired high-analysis granular ammonium polyphosphates by the atmospheric-pressure ammoniation of superphosphoric acid preferably containing more than about 80 percent $P_2O_5$.

Referring now more specifically to FIG. 2, superphosphoric acid (>80 percent $P_2O_5$) from a source not shown is fed through line 51 and any suitable means 52 for controlling the rate of flow into hydrolyzer 53. Anhydrous ammonia from a source not shown is fed into hydrolyzer 53 through line 54 and means 55 for controlling the rate of flow. Water from a source not shown is fed into hydrolyzer 53 through line 56 and means 57 for controlling the rate of flow. Hydrolizer 53 is equipped with a pH meter not shown, cooling coils 58 to control the temperature of the solution in the range from about 70° to about 110° C., and a motor-driven agitator 59 running at such speed as to obtain rapid and intimate mixing of the acid, water, and ammonia. The three reactants are added simultaneously and at such rates as to maintain a solution with a selected pH in the range of about 0.1 to about 4 and a gross composition of more than about 33 weight percent total $(N+P_2O_5)$, preferably more than about 50 weight percent total $(N+P_2O_5)$ and in which the species more condensed than tripolyphosphate are reduced to about 15 percent. We prefer to add the acid and water to hydrolzer 53 at fixed rates according to the capacity of the equipment and to vary the rate of addition of anhydrous ammonia as may be necessary to maintain the desired pH of the resultant solution. The average retention time in hydrolyzer 53 normally will be in excess of about 5 minutes.

When the solution from hydrolyzer 53 contains between about 15 and about 30 percent of its phosphate in species more condensed than tripolyphosphate, the solution from hydrolyzer 53 is transferred by alternate No. 2 to a group of batch hydrolyzers 64 where it is mixed with anhydrous ammonia and make-up water as indicated in the diagram and as described in application Ser. No. 765,743, now U.S. Patent 3,520,652.

The solution from the continuous hydrolyzer 53, which contains no more than about 15 percent of its phosphate in species more highly condensed than tripolyphosphate is fed to precipitator 60, where it is reacted with anhydrous ammonia from a source not shown that is fed into vessel 60 through line 76 and means 77 for controlling the rate of flow. Precipitator 60 is equipped with a pH meter not shown and a motor-driven agitator 78 running at such speed as to obtain rapid and intimate mixing of the anhydrous ammonia and the solution from the continuous hydrolyzer 53 or from the batch hydrolyzers 64, which are added simultaneously and at such rates as to maintain a slurry of ammonium phosphates at a selected pH in the range of about 7.4 to about 8.9 with slurry compositions of more than about 45 weight percent total $(N+P_2O_5)$, or preferably ranging from about 13 to about 16 percent N and about 35 to about 42 percent $P_2O_5$. The average retention time in precipitator 60 normally will be in excess of about 5 minutes. The precipitation reaction in vessel 60 preferably is done without cooling and the temperature of the slurry may range from about 50° to about 110° C. To adjust the viscosity and composition of the slurry, water may be added to vessel 60 via line 79 and means 80 for controlling the rate of flow.

In the precipitator the water content will range from about 20 to about 47 percent. The unreacted ammonia from precipitator 60 is recycled to hydrolyzer 53 via line 81, scrubber 82, and line 83.

The slurry from precipitator 60 is discharged through line 84 to granulator 85 where it is mixed with recycle fines. The moist granules, normally containing about 1 to 8 percent free water, are fed through line 86 into a dryer 87 operating in the temperature range of about 50° to about 110° C. The dry granules from 87 travel via line 88 to a screening means generally illustrated as screens 89 and crusher 90. The crushed oversize material and the fine material are returned to granulator 85 via lines 91 and 92, respectively. The granular product discharged through line 93 to storage, will contain about 17 to about 21 percent N and about 52 to about 60 percent $P_2O_5$ and will consist of ammonium ortho-, pyro-, and tripolyphosphates in approximately equal proportions.

In order that those skilled in the art may better understand how the present invention can be practiced, the following examples of specification applications are given by way of illustration but not by way of limitation.

This modification of our process, illustrated in FIG. 2, was developed from a series of tests to determine the effects of pH, temperature, and reaction time on the hydrolysis of the condensed phosphate species in superphosphoric acid containing more than about 80 percent $P_2O_5$. The object of the tests was to prepare at high pH, intermediate slurries suitable for granulation that contained N and $P_2O_5$ in amounts corresponding to degrees of ammoniation in excess of 7 pounds $NH_3$ per unit (20 pounds) of $P_2O_5$, and that contained mostly ortho-, pyro-, and tripolyphosphates.

EXAMPLE I

In one test, the concentrated acid (83.4 percent $P_2O_5$), water, and ammonia were combined under the conditions (70° C. and pH 5.8) that are used commercially to produce 11-37-0 solution from less concentrated acid (about 78 percent $P_2O_5$). This solution then was treated with anhydrous ammonia to pH 9.6; no precipitation occurred, in contrast to tests in which the intermediate solution (11-37-0) prepared from less concentrated acids (<80 percent $P_2O_5$) were used, as described in U.S. Letters Patent 3,484,192, supra.

EXAMPLE II

Figure 1:
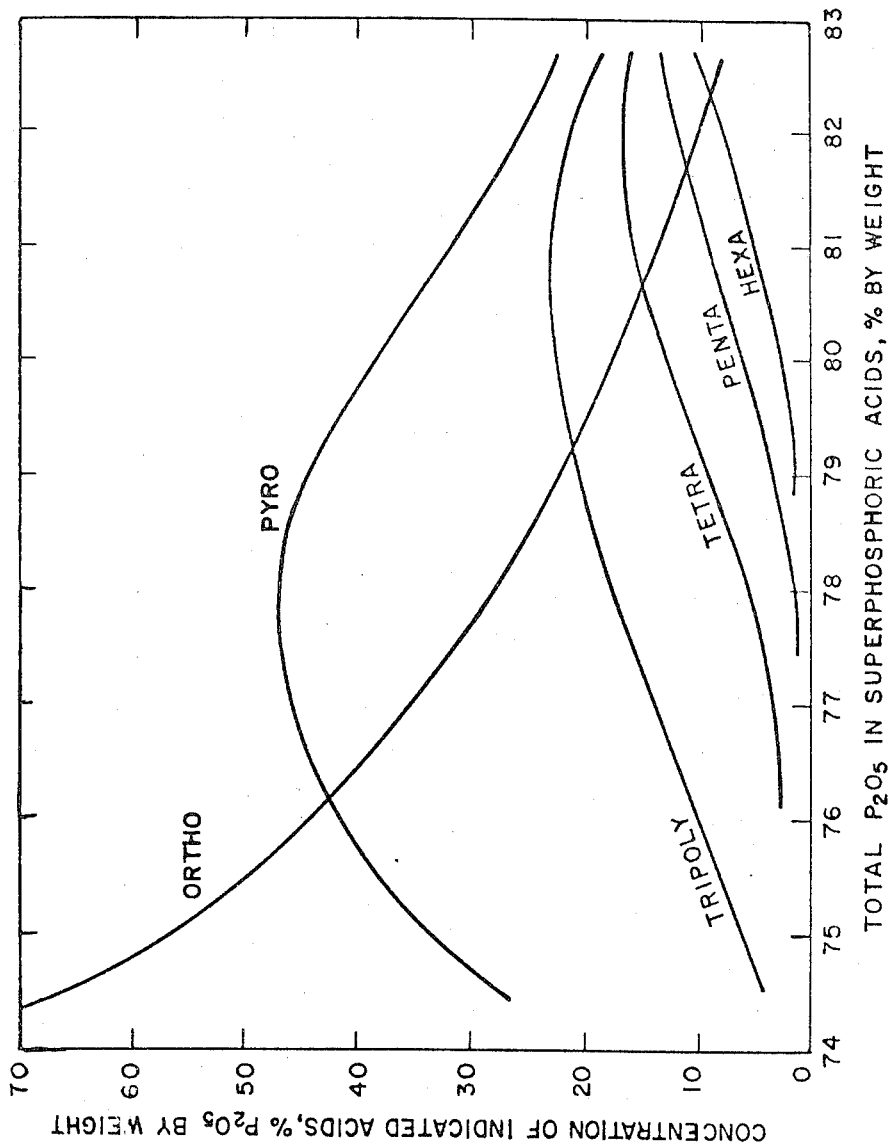
FIG. 1 is a graphical illustration showing the distribution of the principal acid species in commercially available electric-furnace superphosphoric acids which were used in the development of our process.

In another test, the same conditions of Example I were used except that the initial ammoniation was carried out at pH 4. The final ammoniation was stopped at pH 9.6 as before. The product was a milky liquid that became a white viscous gel on standing a few days. About two-thirds of the phosphorus in the concentrated acid (83.4 percent $P_2O_5$) used in Examples I and II is more highly condensed than tripolyphosphate, as indicated in FIG. 1. In these examples, the long-chain phosphate species were not hydrolyzed rapidly enough to form sufficient amounts of ortho-, pyro-, and tripolyphosphates for precipitation.

Further tests of our controlled hydrolysis process were made in which superphosphoric acids (>80 percent $P_2O_5$) were ammoniated and hydrolyzed under conditions that would accelerate the necessary hydrolysis reactions. In these subsequent tests, the initial ammoniation and hydrolysis reactions required were carried out continuously in one reactor, as detailed in the following examples.

EXAMPLE III

In one test of our controlled hydrolysis process, as generally illustrated in FIG. 2, electric-furnace superphosphoric acid (83.1 percent $P_2O_5$), water, and anhydrous ammonia were combined continuously at pH about 1.9 (weight ratio N:$P_2O_5$, 0.125) to form a solution that contained 6.6 percent N and 53.0 percent $P_2O_5$. In this first ammoniation step, the retention time was 5 minutes and the temperature of the solution was maintained in the range of 90° to 110° C. by means of cooling coils. The solution from the hydrolyzer at pH 1.9 was fed into a precipitation vessel where it was combined with anhydrous ammonia and water. The temperature was maintained at about 90° C. and the pH was maintained at about 8.4 while producing continuously a slurry of ammonium polyphosphates with a gross composition of 14.2 percent N and 38.8 percent $P_2O_5$. In this second ammoniation step, the retention time was about 40 minutes, and water was added to adjust the viscosity and to maintain the water content of the slurry at about 35 percent by weight. The slurry was mixed with product recycle fines in the ratio of 1 part slurry to 4 parts recycle, and the moist granules (about 8 percent $H_2O$) were dried at 66° C. to form a hard granular product with good physical properties that contained 18.2 percent N and 58.4 percent $P_2O_5$ distributed as ortho- 39, pyro- 36, tripoly- 23, and more highly condensed phosphates, 2 percent.

The fraction of the phosphorus present in forms more highly condensed than tripolyphosphate decreased from about 58 percent in the acid to about 14 percent in the first stage of ammoniation (hydrolyzer), but there was no significant further hydrolysis in the second stage (precipitator). Further hydrolysis occurred, however, during granulation. The phosphorus present in forms more highly condensed than tripolyphosphate decreased from about 14 percent in the slurry to about 2 percent in the granular product.

EXAMPLE IV

In another test of our controlled hydrolysis process, as generally illustrated in FIG. 2, less concentrated electric-furnace superphosphoric acid (81.5 percent $P_2O_5$), anhydrous ammonia, and water were combined continuously at pH 2.1 (weight ratio N:$P_2O_5$, 0.155) to form a solution that contained 7.2 percent N and 46.4 percent $P_2O_5$. The retention time in the hydrolyzer was about 10 minutes, and the temperature of the solution was maintained in the range 82° to 87° C. by means of cooling coils. The solution from the hydrolyzer at pH 2.1 was fed into a precipitator where it was combined with anhydrous ammonia and water to produce continuously a slurry of ammonium polyphosphates with a gross composition of 14.6 percent N and 39.7 percent $P_2O_5$. In this second ammoniation step, the pH was maintained at about 8.6, the temperature was about 90° C., the retention time was about 30 minutes, and the water was added to maintain the water content of the slurry at about 30 percent by weight. The slurry produced continuously in the precipitator was granulated as described in Example III. The granular product had good physical properties, and contained 18.7 percent N and 59.0 percent $P_2O_5$ distributed as ortho- 34, pyro- 39, tripoly- 25, and more highly condensed phosphate species 2 percent.

The fraction of the phosphorus present in forms more highly condensed than tripolyphosphate decreased from about 45 percent in the acid to about 17 percent during the first stage of ammoniation (hydrolyzer), but no significant further hydrolysis occurred in the second ammoniation stage (precipitator)—a hydrolysis pattern similar to that described in Example III. As before, further hydrolysis occurred during granulation; the phosphorus present in forms more highly condensed than tripolyphosphate decreased from about 17 percent in the slurry to about 2 percent in the granular product.

EXAMPLE V

In still another test of our controlled hydrolysis process, as generally illustrated in FIG. 2, electric-furnace superphosphoric acid (83.1 percent $P_2O_5$), anhydrous ammonia, and water were combined continuously at pH about 1.1 (weight ratio N:$P_2O_5$, 0.071) to form a solution that contained 3.4 percent N and 47.7 percent $P_2O_5$. The retention time in the hydrolyzer was about 5 minutes, and the temperature of the solution was maintained in the range 70° to 106° C. by means of cooling coils. The solution from the hydrolyzer at pH 1.1 was fed into a precipitator where it was combined with anhydrous ammonia and water to produce continuously a slurry of ammonium polyphosphate with a gross composition of 14.8 percent N and 41.7 percent $P_2O_5$. In the second ammoniation step, the pH was maintained at about 8.0, the temperature was about 90° C., the retention time was about 20 minutes, and the water was added to adjust the viscosity and to maintain the water content of the slurry at about 25 percent by weight. The slurry produced continuously in the precipitator was granulated as described in Example III. The granular product had good physical properties, and contained 20.2 percent N and 57.2 percent $P_2O_5$ distributed as ortho- 48, pyro- 35, and tripolyphosphate 17 percent.

The fraction of the phosphorus present in forms more highly condensed than tripolyphosphate decreased from about 58 percent in the acid to about 7 percent during the first stage of ammoniation (hydrolyzer), and during the first stage of ammoniation the orthophosphate content increased from about 7 percent in the acid to about 47 percent in the hydrolyzer solution. Under the conditions of this test, therefore, the degree of hydrolysis exceeded that desired, and as a consequence the final granular product had a relatively low tripolyphosphate content.

From the above examples, it will be appreciated that when our invention is carried out according to our desired objectives, the product therefrom is unique and new in that it contains about equal proportions of ortho-, pyro-, and tripolyphosphates. The uniqueness of this product will be appreciated when it is compared with the distribution of the ortho-, pyro-, and tripolyphosphates occurring under equilibrium conditions as shown in the 1956 Canadian Journal of Chemistry, supra. It should, of course, be further appreciated that under the most ideal and exacting conditions of operating our process, these three constituents will be present, as just stated, in about equal proportions. However, as may be seen from the examples supra, when our process is operated under practical conditions, the hydrolysis of the tripolyphosphate proceeds a bit more rapidly than the pyrophosphate species such that the resulting product contains about a third of the ortho- and of the pyro- and only about a quarter portion of the tripolyphosphate. These proportions, of course, vary over small ranges, as may be seen in Examples III and IV, supra, the ortho- ranges from 34 to 39 percent of the total, the pyro- ranges from 36 to 39 percent of the total, and the tripoly- ranges from 23 to 25 percent of the total. From the data of these examples and from data obtained from other tests we have conducted, we now are able to set the operable ranges of these three constituents in our product as follows:

Orthophosphate _____ about 33 to about 40
Pyrophosphate _____ about 33 to about 40
Tripolyphosphate _____ about 22 to about 30

While we have shown and described particular embodiments of our invention, modifications and variations thereof will occur to those skilled in the art. We wish it to be understood, therefore, that the appended claim is intended to cover such modifications and variations that are within the true scope and spirit of the invention.

What we claim as new and desire to secure by Letters Patent of the United States is:

1. An improved fully integrated process for the production of ammonium polyphosphate which comprises the steps of: at atmospheric pressure:
   (1) simultaneously introducing a steam of superphosphoric acid and streams of anhydrous ammonia and water into a first reaction zone, said superphosphoric acid containing more than about 80 percent $P_2O_5$ by weight; therein rapidly and intimately mixing said streams; controlling the proportions of said superphosphoric acid, anhydrous ammonia, and water such that the reactants have a retention time in said first reaction zone in excess of about 5 minutes and that the resulting reaction product formed in the temperature range of about 70° to about 110° C. has a pH in the range of about 0.1 to about 4 and contains more than about 33 weight percent total $(N+P_2O_5)$, in which the phosphate species more condensed than tripolyphosphate is reduced to about 15 percent of the total phosphate;
   (2) withdrawing a stream of the reaction product from said first reaction zone and introducing said withdrawn reaction product directly into a second reaction zone, wherein the said withdrawn reaction product, together with a stream of anhydrous ammonia and a stream of makeup water are added to adjust the viscosity and to maintain the water content of the mixture in said second reaction zone in the range of about 20 to about 47 percent by weight; maintaining the temperature in said second reaction zone in the range from about 50° to 110° C.; controlling the relative proportions of anhydrous ammonia and reaction product added to said second reaction zone to maintain a pH therein within the range from about 7.4 to 8.9, said pH adjustment sufficient to form in said second reaction zone a slurry which has a gross composition of more than about 45 weight percent total $(N+P_2O_5)$; retaining said slurry in said reaction zone for a period in excess of about 5 minutes;
   (3) withdrawing a stream of said slurry from said second reaction zone and subjecting said withdrawn stream of slurry to granulation and drying (temperature ranging from about 50° to about 110° C.) operations and recovering therefrom a solid product which comprises ammonium ortho-, pyro-, and tripolyphosphates in approximately equal proportions, and which contains by weight from about 17 to about 21 percent nitrogen and from about 52 to about 60 percent $P_2O_5$.

References Cited
UNITED STATES PATENTS 3,243,279  3/1966  Young.
3,382,059  5/1968  Getsinger.

OTHER REFERENCES

New Developments in Fertilizer Technology, TVA, 1966, pp. 52–55.

OSCAR R. VERTIZ, Primary Examiner

G. A. HELLER, Assistant Examiner

U.S. Cl. X.R.

71—34, 43